(12) United States Patent
Randall et al.

(10) Patent No.: US 10,559,096 B2
(45) Date of Patent: *Feb. 11, 2020

(54) DIGITAL PAINT GENERATION BASED ON PHYSICAL DIGITAL PAINT PROPERTY INTERACTION

(71) Applicant: Adobe Inc., San Jose, CA (US)

(72) Inventors: Mark M. Randall, Folsom, CA (US); Abraham Moshe Muchnick, Woodmere, NY (US); Benoit Ambry, Fair Oaks, CA (US); Kushith C. Amerasinghe Godagamage, San Francisco, CA (US); Jean-Sylvere Charles Simonet, Rockville, MD (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/701,182

(22) Filed: Sep. 11, 2017

(65) Prior Publication Data
US 2019/0080485 A1     Mar. 14, 2019

(51) Int. Cl.
| | |
|---|---|
| G09G 5/02 | (2006.01) |
| G06T 11/00 | (2006.01) |
| G06F 3/0484 | (2013.01) |
| G06F 3/0481 | (2013.01) |
| G06F 3/0488 | (2013.01) |
| G06T 11/60 | (2006.01) |

(52) U.S. Cl.
CPC .......... *G06T 11/001* (2013.01); *G06F 3/0488* (2013.01); *G06F 3/04817* (2013.01); *G06F 3/04842* (2013.01); *G06F 3/04845* (2013.01); *G06F 3/04847* (2013.01); *G06T 11/60* (2013.01)

(58) Field of Classification Search
CPC .................................................... G06T 11/001
See application file for complete search history.

(56) References Cited

U.S. PATENT DOCUMENTS

| | | | |
|---|---|---|---|
| 5,409,379 A | 4/1995 | Montag et al. | |
| 5,432,896 A * | 7/1995 | Hwong | ................. G06T 11/001 345/592 |
| 9,240,063 B1 | 1/2016 | Tremblay et al. | |
| 9,734,635 B1 | 8/2017 | Gorumkonda | |
| 2009/0085880 A1 | 4/2009 | Vitale et al. | |
| 2009/0222469 A1 | 9/2009 | Maillot et al. | |

(Continued)

OTHER PUBLICATIONS

"First Action Interview Office Action", U.S. Appl. No. 15/701,330, dated Mar. 7, 2019, 62 pages.

(Continued)

*Primary Examiner* — Charles Tseng
(74) *Attorney, Agent, or Firm* — SMBC

(57) ABSTRACT

Digital paint generation techniques and systems are described that are configured to bridge a perceived divide between functionality made available to users to create digital content and the users' understanding as to how this functionality is to be used. A variety of techniques and systems are described that support this expansion. In one example, interaction of physical digital paint properties with each other as part of generating digital paint is used to expand functionality of digital paint generation beyond conventional color selection techniques.

20 Claims, 12 Drawing Sheets
(5 of 12 Drawing Sheet(s) Filed in Color)

(56) References Cited

U.S. PATENT DOCUMENTS

| | | |
|---|---|---|
| 2009/0262130 A1 | 10/2009 | Ramirez |
| 2011/0271216 A1 | 11/2011 | Wilson |
| 2011/0274348 A1 | 11/2011 | Oicherman et al. |
| 2014/0132617 A1* | 5/2014 | Bhattacharyay ...... G06T 11/001 345/582 |
| 2014/0132619 A1* | 5/2014 | Landsberger ......... G06T 11/001 345/589 |
| 2014/0153825 A1 | 6/2014 | Jones et al. |
| 2014/0267223 A1 | 9/2014 | Sumner et al. |
| 2019/0079661 A1 | 3/2019 | Randall et al. |
| 2019/0080486 A1 | 3/2019 | Randall et al. |
| 2019/0080487 A1 | 3/2019 | Randall |
| 2019/0096096 A1 | 3/2019 | Randall et al. |

OTHER PUBLICATIONS

"Pre-Interview First Office Action", U.S. Appl. No. 15/701,029, dated Feb. 4, 2019, 65 pages.

"Pre-Interview First Office Action", U.S. Appl. No. 15/701,303, dated Feb. 19, 2019, 32 pages.

"Pre-Interview First Office Action", U.S. Appl. No. 15/701,330, dated Jan. 22, 2019, 62 pages.

"Pre-Interview First Office Action", U.S. Appl. No. 15/716,311, dated Feb. 19, 2019, 64 pages.

"Final Office Action", U.S. Appl. No. 15/701,330, dated May 3, 2019, 21 pages.

"First Action Interview Office Action", U.S. Appl. No. 15/701,303, dated Apr. 4, 2019, 32 pages.

"First Action Interview Office Action", U.S. Appl. No. 15/701,029, dated Mar. 20, 2019, 65 pages.

"First Action Interview Office Action", Application Number, dated Mar. 29, 2019, 58 pages.

"Notice of Allowance", U.S. Appl. No. 15/701,303, dated Jun. 12, 2019, 8 pages.

"Notice of Allowance", U.S. Appl. No. 15/701,029, dated Jun. 27, 2019, 9 pages.

"Notice of Allowance", U.S. Appl. No. 15/701,330, dated Aug. 13, 2019, 11 pages.

"Notice of Allowance", U.S Appl. No. 15/716,311, dated Jul. 15, 2019, 8 pages.

"Supplemental Notice of Allowance", U.S. Appl. No. 15/701,029, dated Sep. 9, 2019, 2 pages.

"Supplemental Notice of Allowance", U.S. Appl. No. 15/701,303, dated Jul. 3, 2019, 2 pages.

"Supplemental Notice of Allowance", U.S. Appl. No. 15/701,303, dated Aug. 21, 2019, 2 pages.

"Supplemental Notice of Allowance", U.S. Appl. No. 15/701,303, Oct. 3, 2019, 2 pages.

* cited by examiner

DIGITAL PAINT GENERATION BASED ON PHYSICAL DIGITAL PAINT PROPERTY INTERACTION

BACKGROUND

The ways in which users are able to create digital images through interaction with computing devices continues to expand. However, the techniques used to select and generate colors have not kept pace with this expansion. For example, conventional techniques are limited to selecting a particular hue for a color, which limits functionality that otherwise may be made available to users.

Further, these conventional techniques typically rely on complex user interface interactions and thus require expertise that make these systems unapproachable by untrained and novice users. For example, a user may take years of practice and training in order to consistently achieve a desired result, e.g., a desired color for use as part of a digital image. As a result, this functionality as implemented by conventional systems may cause users to confuse an initial lack of understanding in how to use this functionality with an inability to do so due to lack of an innate ability. Therefore, conventional systems may be considered to be unapproachable by novice and casual users and further have not expanded beyond conventional use of color as part of the digital image.

SUMMARY

Digital paint generation techniques and systems are described that are configured to generate digital paint in an efficient and intuitive manner. These techniques and systems overcome limitations of conventional systems to expand how digital paint is able to be represented in a user interface through use of physical digital paint properties. This supports the creation of digital images having characteristics that are not possible using conventional systems that are limited to conventional uses of color. Further, these techniques and systems bridge a perceived divide between functionality made available to users to create digital images and the users' understanding as to how this functionality is to be used. In this way, the digital paint generation techniques and systems as implemented by an image processing system expand accessibility and availability of a range of digital image creation techniques to a wider range of users.

In one example, the digital paint generation techniques are configured to support physical digital paint properties as part of generation of the digital paint by an image processing system. Physical digital paint properties, for instance, may be used to mimic physical digital paint in the real world, such as medium (e.g., chalk, ink), surface (e.g., paper, metal), instrument used to apply the medium (e.g., brush, pencil), technique used by the instrument to apply the medium (e.g., layered, blending), environment in which the medium and surface as disposed (e.g., lighting conditions), and so forth.

The physical digital paint properties may also expand to realize capabilities that are not limited to the physical world, such as meta-conditions including particle gravity, attraction, sparkles, dynamic gradients and repulsion as part of an animation of the digital paint. Thus, the physical digital paint properties permit user interaction to expand beyond selection of colors as limited by conventional systems to also include how those physical properties define how digital paint having those colors is perceived when rendered in a user interface. Further, these physical digital paint properties may also expand how digital paint is incorporated as part of a digital image, thereby supporting creation of art that is not possible using conventional techniques.

Further, the digital paint generation techniques also support defined interactions between these physical digital paint properties. A physical digital paint property for a medium as "fire," for instance, may have a defined interaction with a physical digital paint property for a surface as "wood." Therefore, a defined interaction between these physical digital paint properties may cause the generated digital paint to appear as if burning the wood, e.g., as part of an animation of the digital paint when rendered. As a result, this interaction as part of digital paint generation may address physical digital paint properties that define how the digital paint is to appear as well as interaction of these properties. This is not possible in conventional techniques that are limited to color and did not address physical digital paint properties nor interaction of these properties with each other as part of rendering the digital paint.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawings will be provided by the Office upon request and payment of the necessary fee.

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
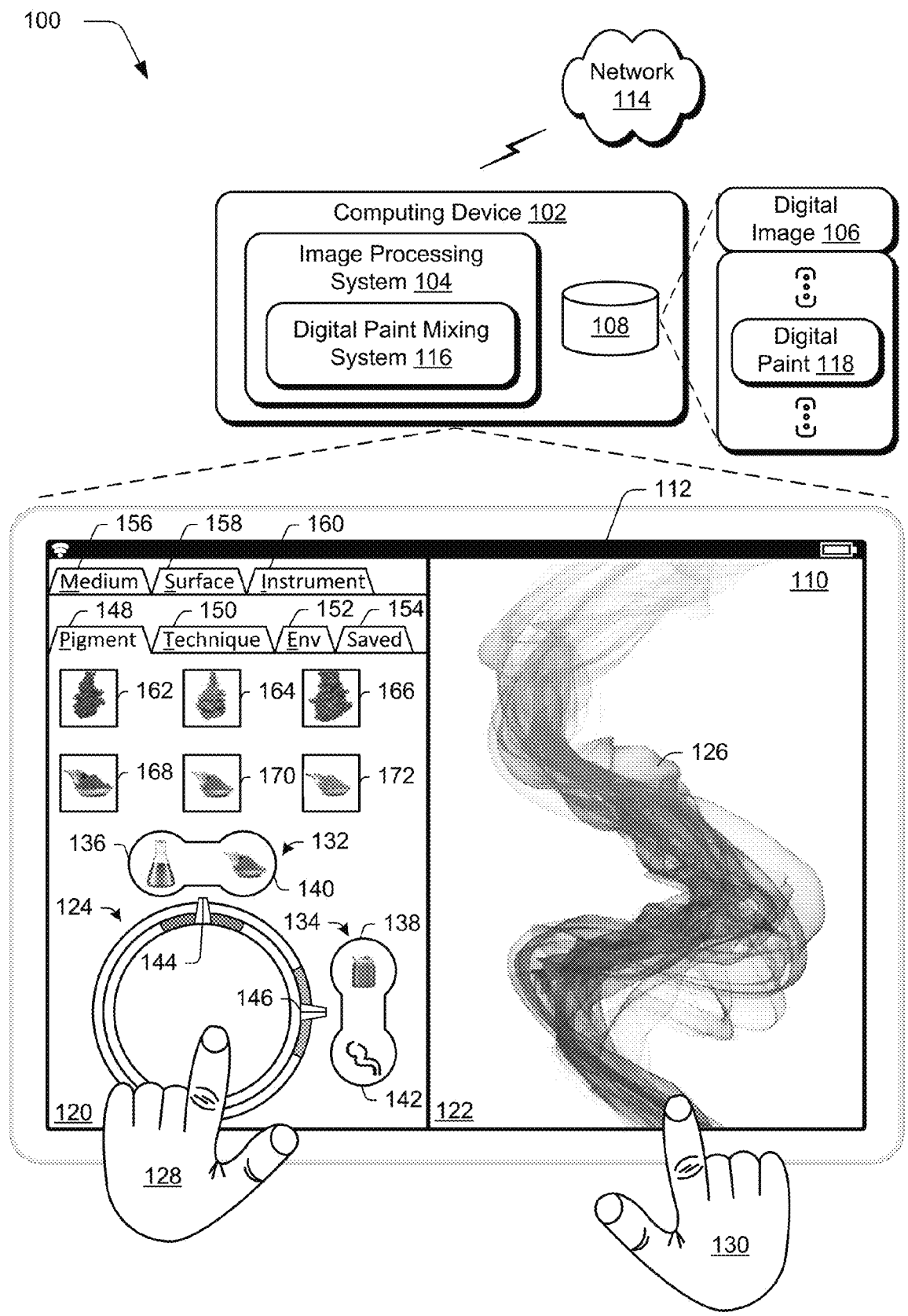
FIG. 1 is an illustration of an environment in an example implementation that is operable to employ techniques described herein.

Digital paint generation techniques and systems are described that support physical digital paint properties and interaction of these properties with each other as part of generating digital paint. As a result, digital paint generated using these techniques may expand beyond conventional techniques used to pick a color to now include dynamic and complex interactions, e.g., as part of an animation of the digital paint. This supports creation of types of art as part of the digital images that is not possible using conventional techniques based solely on color.

In one example, a digital paint generation technique supports user interaction to define digital color properties to be used to generate digital paint. This includes color digital paint properties that define a pigment (e.g., hue) to be used to generate the digital paint, e.g., red, green, blue, etc. This technique, for instance, may be used to mix two or more different pigments to generate a desired hue of digital paint, e.g., purple, indigo, chartreuse, and so on. This also includes physical digital paint properties, such as medium (e.g., chalk, ink), surface (e.g., paper, metal), instrument used to apply the medium (e.g., brush, pencil), technique used by the instrument to apply the medium (e.g., layered, blending), environment in which the medium and surface as disposed (e.g., lighting conditions), and so forth. In this way, user interaction supported by this technique may expand beyond conventional color selection techniques described above to support combinations of properties that are not possible in conventional systems.

The combination and adjustment of color and physical digital paint properties may be used by the image processing system to aid a user in understanding effects of color and physical digital paint property interaction. A color digital paint property, for instance, may represent a certain hue of red, e.g., R210, G10, B30. However, the same hue combined with a physical digital paint property may cause the hue to have the specularity of a heavy oil-based paint. This hue and physical digital paint property combination would be considered, when viewed by a user, to have a different color even though it is based on the same RGB value. Therefore, the user may view how combinations of color and physical digital paint properties interact with each other as part of digital paint generation. This is not possible using conventional color selection systems that are based solely on color.

Further, the image processing system also supports interactions of physical digital paint properties with each other, and as such expands functionality made available as part of paint generation beyond conventional color selection systems. Digital paint, for instance, may be generated that includes a physical digital paint property as a medium of water and another physical digital paint property specifying a surface as wood. Interaction between these properties is defined by the image processing system to cause digital paint, when generated and rendered in a user interface, to appear to make the wood wet. In another instance, digital paint is generated that includes a physical digital paint property as a medium of fire and another physical digital paint property specifying a surface as wood. Accordingly, an interaction is defined by the image processing system that causes the digital paint, when generated in a user interface, to appear to burn or scorch the wood. Thus, the digital paint generation techniques support use of physical digital properties as well interaction of these properties with each other.

These interactions may also expand beyond mimicking interactions in the physical world to include any physical digital paint property that can be imagined by the user and defined (e.g., mathematically) for rendering by the image processing system. The physical digital paint properties, for instance, may include meta-conditions including particle gravity, attraction, sparkles, dynamic gradients and repulsion as part of an animation of the digital paint. Consequently, the digital paint and digital images created using this paint may be created and rendered by the image processing system that has never been seen before. In this way, creation of digital paint may be untethered from conventional digital image creation techniques to mimic the physical world (e.g., use of brushes, pens, pencils) to creating imaginary and fanciful digital paint as part of digital images.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ digital paint generation techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 12.

The computing device 102 is illustrated as including an image processing system 104. The image processing system 104 is implemented at least partially in hardware of the computing device 102 to process and transform a digital image 106, which is illustrated as maintained in a storage device 108 of the computing device 102. Such processing includes creation of the digital image 106, modification of the digital image 106, and rendering of the digital image 106 in a user interface 110 for output, e.g., by a display device 112. Although illustrated as implemented locally at the computing device 102, functionality of the image processing system 104 may also be implemented as whole or part via functionality available via the network 114, such as part of a web service or "in the cloud."

An example of functionality incorporated by the image processing system 104 is represented as a digital paint mixing system 116. The digital paint mixing system 116 is implemented in functionality of the computing device 102 (e.g., a processing system and computer-readable storage media) to generate digital paint 118 for rendering in the user interface 110 of the display device 112 and/or inclusion as part of the digital image 106. The digital paint 118 is also illustrated as stored in the storage device 108.

The digital paint mixing system 116 in this example is configured to support output of the user interface 110 as having a paint generation control portion 120 and a paint generation output portion 122. The paint generation control portion 120 is configured to support user interaction to support selection of digital paint properties to be used to generate digital paint as well as amounts of the selected digital paint properties as part of generating the digital paint. The illustrated example of this is a mix control 124. The paint generation output portion 122 is configured to display feedback 126 as a rendering of the digital paint 118 as generated based on user interaction with the paint generation control portion 120.

In one example, a first hand 128 of a user interacts with the mix control 124 to specify amount of the digital paint properties that serve as a basis to generate the digital paint 118. In response, the digital paint mixing system 116 generates and outputs the digital paint 118 in real time to follow another user input received via interaction with a second hand 130 of the user as feedback 126. The second hand 130, for instance, may draw a freeform line in the paint generation output portion 122 of the user interface 110. The digital paint mixing system 116, based on detection of the other input via touchscreen functionality, then generates the digital paint 118 in real time (e.g., through use of pixel shaders) to follow the user input of the second hand 140 as the feedback 126, e.g., in real time. In this way, the digital paint mixing system 116 provides real time feedback 126 regarding an effect of amounts of digital paint properties on generation of the digital paint 118 displayed in the user interface 110.

The mix control 124 may be configured in a variety of ways. In the illustrated example, the mix control 124 is configured to support multi-axis control through use of a first axis 132 and a second axis 134. The first and second axes 132, 134 each include respective first ends 136, 138 and second ends 140, 142. The first and second ends 136, 138, 140, 142 correspond to respective digital paint properties that are user selected. Interaction with the mix control 124 is then used to control the amounts of these digital paint properties that are used to generate the digital paint 118, e.g., as gradations between the options at respective ends of the first and second axes 132, 134.

A user input, for instance, may be detected as initiated by the first hand 128 of the user to move in X and/or Y directions. In this instance, movement in the X direction is used to control amounts of digital paint properties at first and second ends 136, 140 of the first axis 132 of the mix control 124. Likewise, movement in the Y direction is used to control amounts of digital paint properties at first and second ends 138, 142 of the second axis 134 of the mix control 124.

In one example, the input is implemented as a single multi-axis user input to specify an inverse relationship between digital paint properties at the first and second ends 136, 138, 140, 142 of the respective first and second axes 132, 134. Accordingly, an increase in an amount at one end of the axis causes a corresponding decrease in an amount at the other end of the axis through interaction with the mix control 124 through a plurality of gradations. Indications 144, 146 may also be included as part of the mix control 124 to indicate these relative amounts of digital paint properties to be used to generate the digital paint 118 of the respective first and second axes 132, 134.

The mix control 124 may be used to specify a variety of different amounts and types of digital paint properties. Examples of digital paint properties include color digital paint properties, referred to as pigments 148. Color digital paint properties, as pigments 138, describe hues of colors. Hues are an attribute of color by virtue of which it is discernible as red, green, blue, and so on, which is dependent on its dominant wavelength, and independent of intensity or lightness. A user selection, for instance, may be received through interaction with the user interface 110 to select from a variety of pigments 162, 164, 166, 168, 170, 172 options for use at particular ends of the mix control 124. These selections may then be used through interaction with the mix control 124 to generate digital paint 118 having a desired hue.

The digital paint properties may also include physical digital paint properties. Examples of physical digital paint properties include medium 156 (e.g., chalk, ink), surface 158 (e.g., paper, metal), instrument 160 used to apply the medium (e.g., brush, pencil), technique 150 used by the instrument to apply the medium (e.g., layered, blending), 152 environment in which the medium and surface as disposed (e.g., lighting conditions, meta-conditions such as particle gravity and repulsion), and so forth. Further examples of physical digital paint properties are described in relation to FIG. 9. The paint generation control portion 120 of the user interface also includes an option for selection of saved 154 instances of digital paint 118, e.g., as "containers."

In this way, a user may select which digital paint properties are to be used as a basis to generate the digital paint 118, control amounts of the digital paint properties used in the generation through interaction with the mix control 124, and output a result of this generation as feedback 126 in the user interface 110, e.g., in real time. As a result, the digital paint mixing system 116 supports efficient and intuitive techniques to indicate an effect of interaction of these digital paint properties with each other as part of generating the digital paint 118. This digital paint 118 may then be leveraged in a variety of ways, such as to incorporate the digital paint 118 as part of a digital image 106 configured to be rendered by the display device 112. Further discussion of operation of the digital paint mixing system 116 is described in the following sections.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Digital Paint Property Selection and Use

Figure 2:
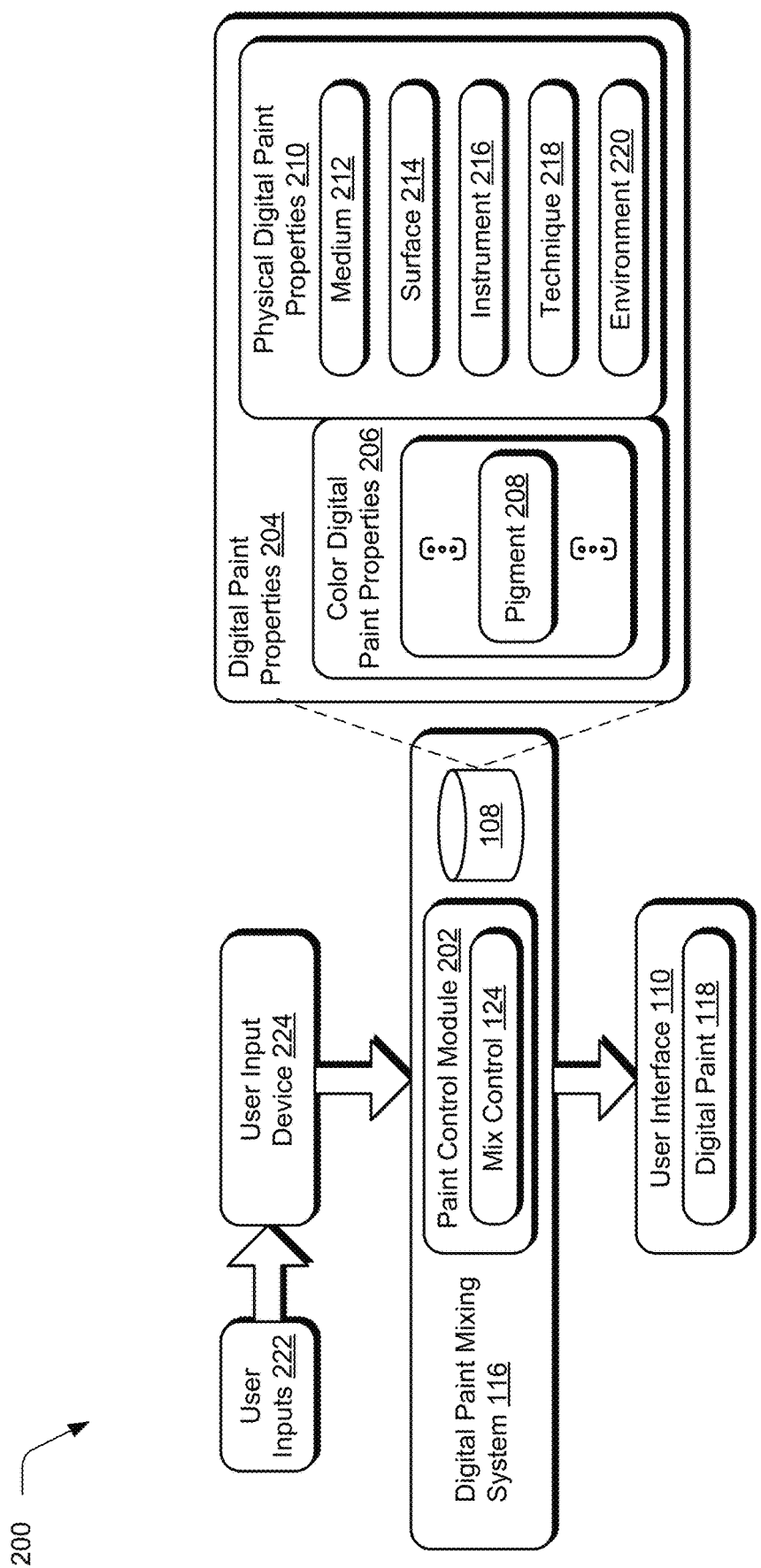
FIG. 2 depicts an example system showing operation of a digital paint mixing system of FIG. 1 in greater detail.
Figure 3:
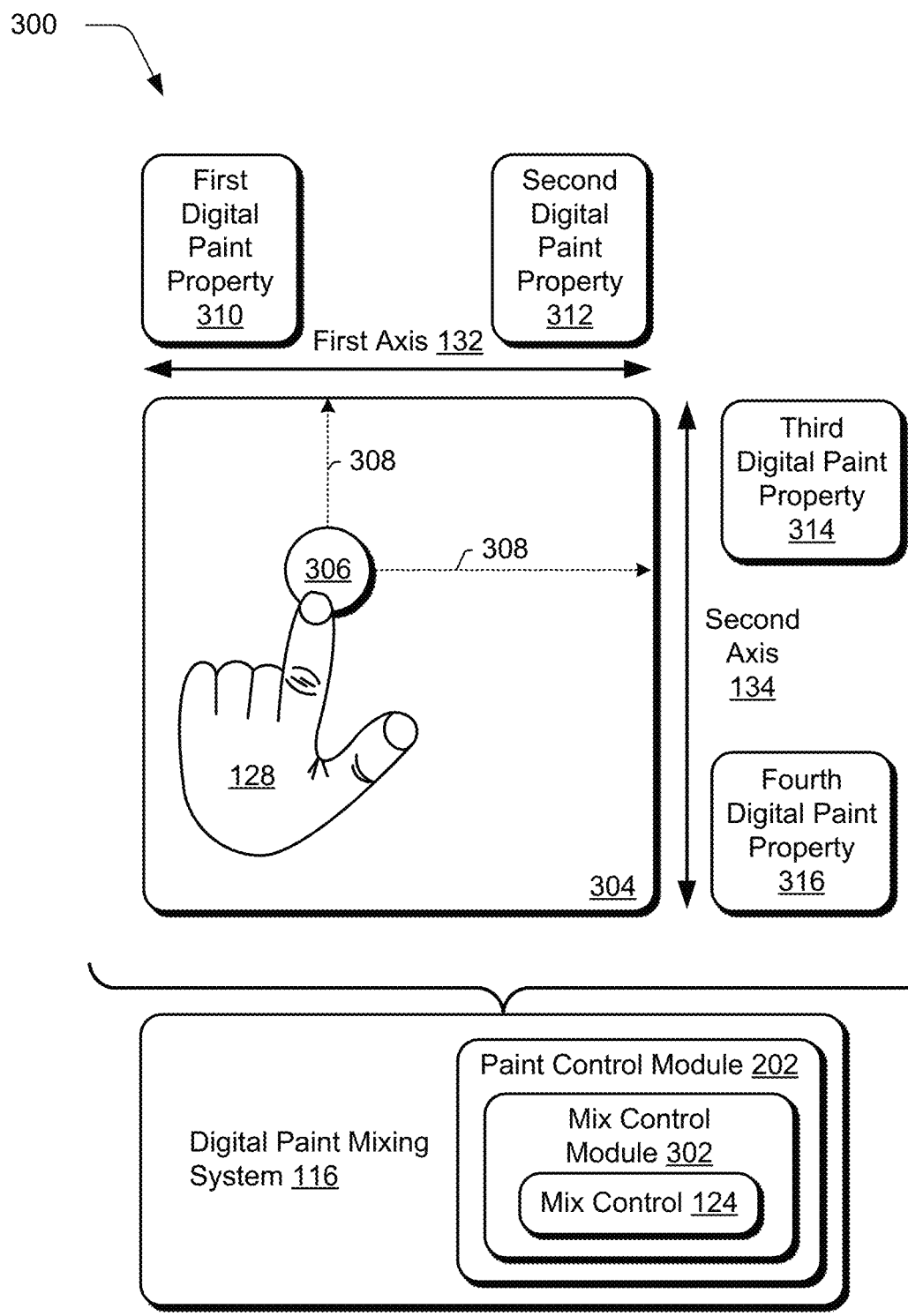
FIG. 3 depicts an example implementation of a mix control of FIG. 2 as a multi-axis control.
Figure 4:
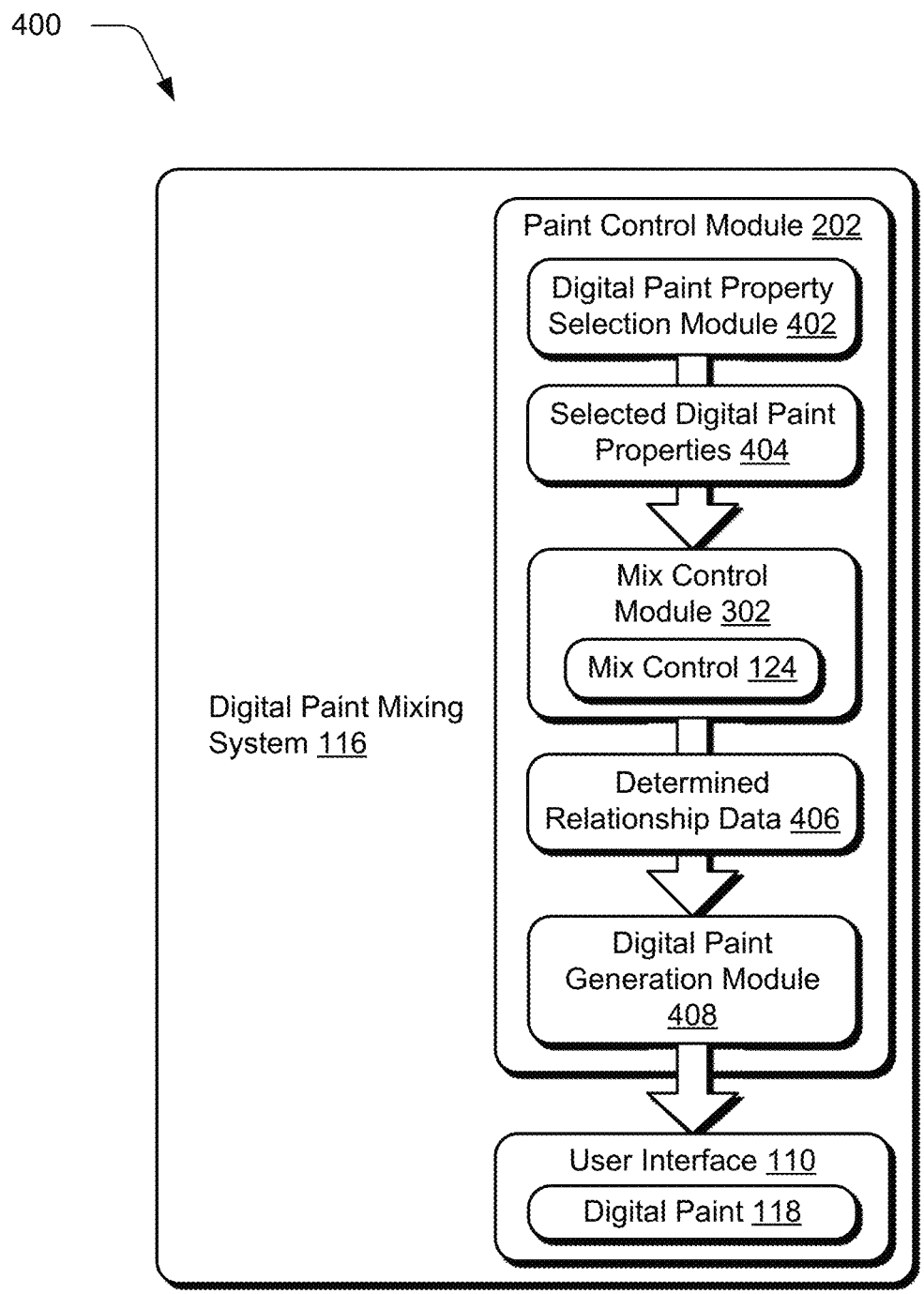
FIG. 4 depicts an example implementation showing operation of a paint control module and mix control of FIG. 2 in greater detail.
Figure 5:
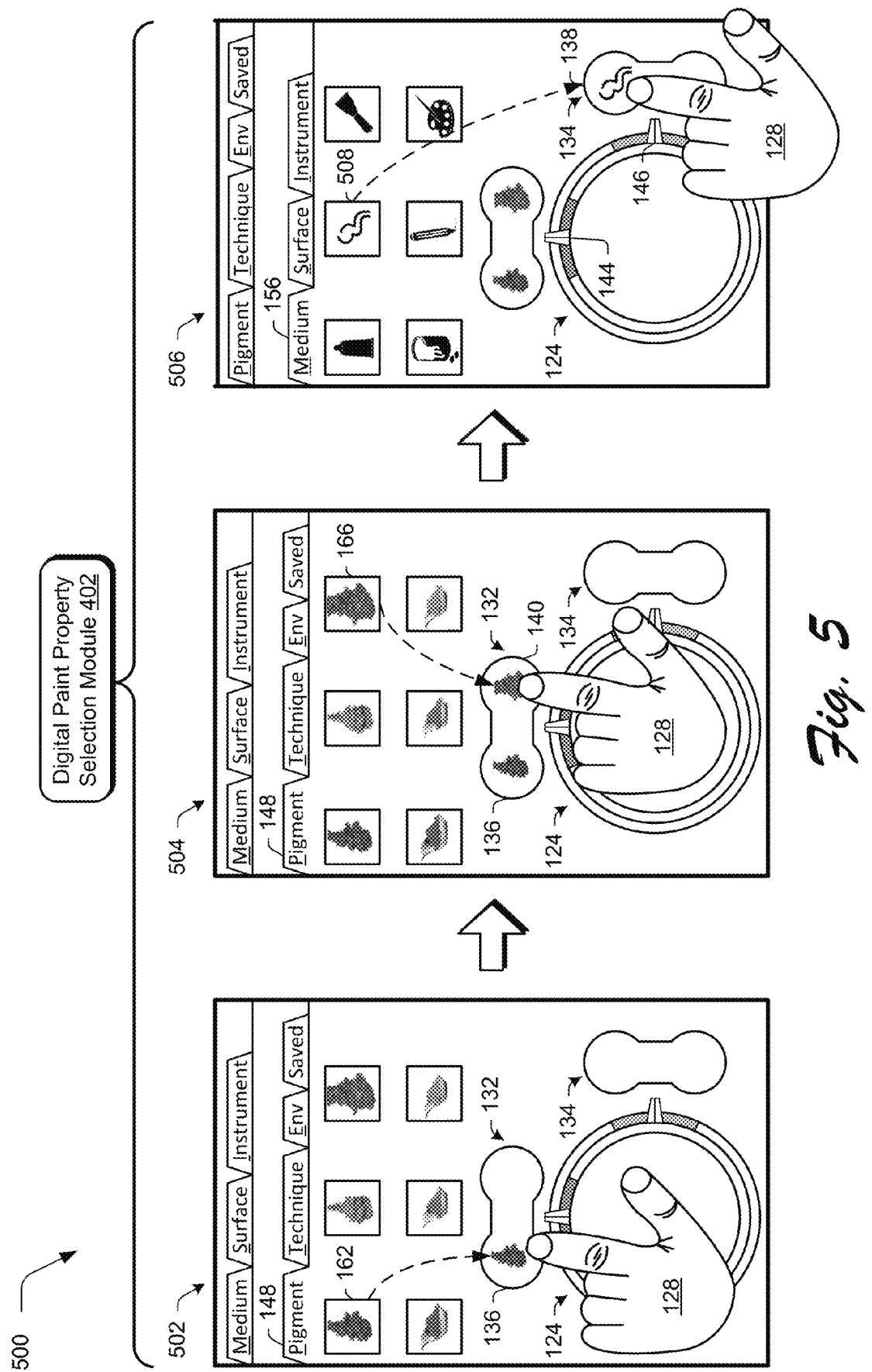
FIG. 5 depicts an example implementation of user selection of digital paint properties for use as part of the mix control.
Figure 6:
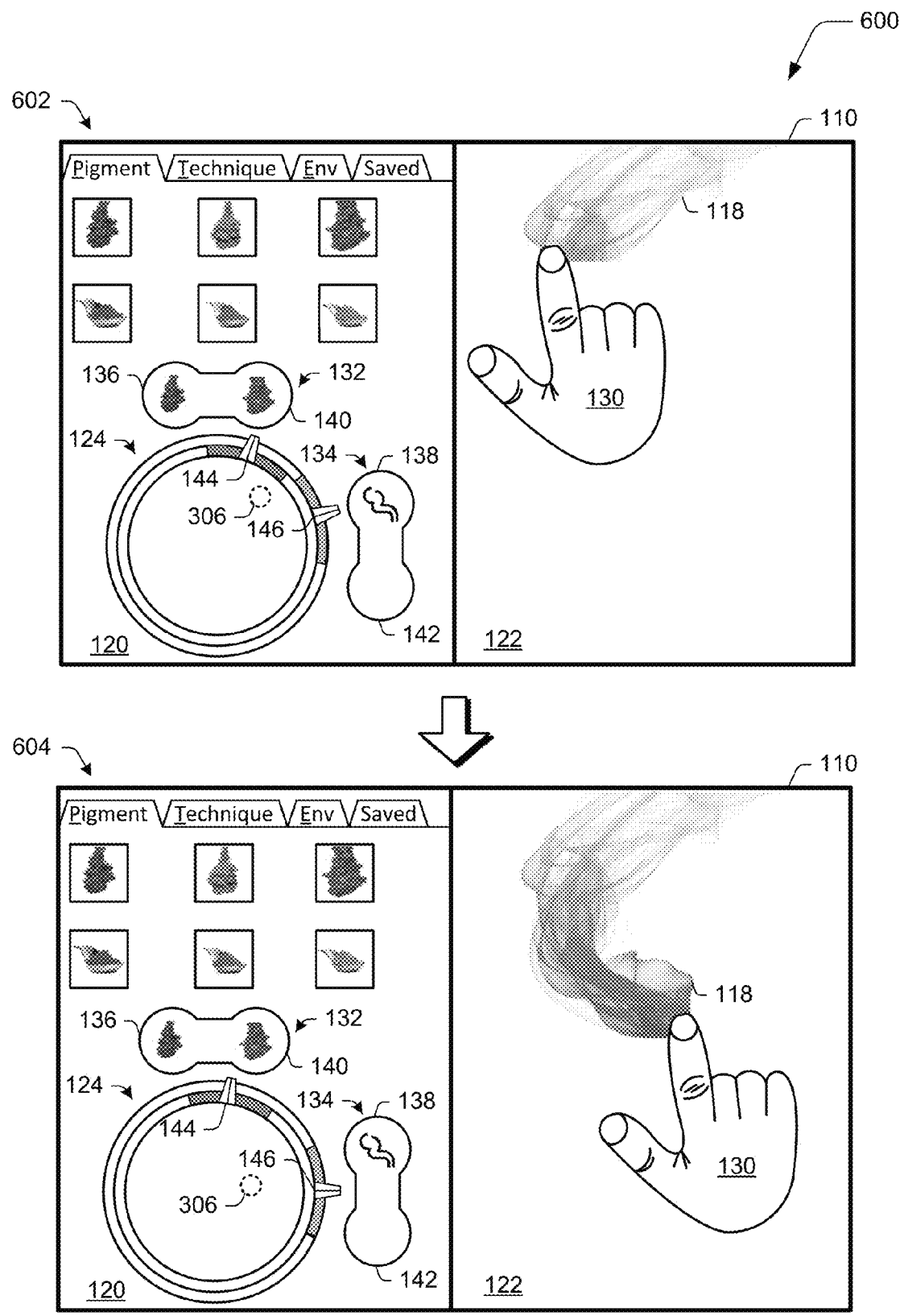
FIGS. 6 and 7 depict example implementations of generation and display of digital paint as feedback in real time caused through interaction with the mix control of FIG. 5.
Figure 7:
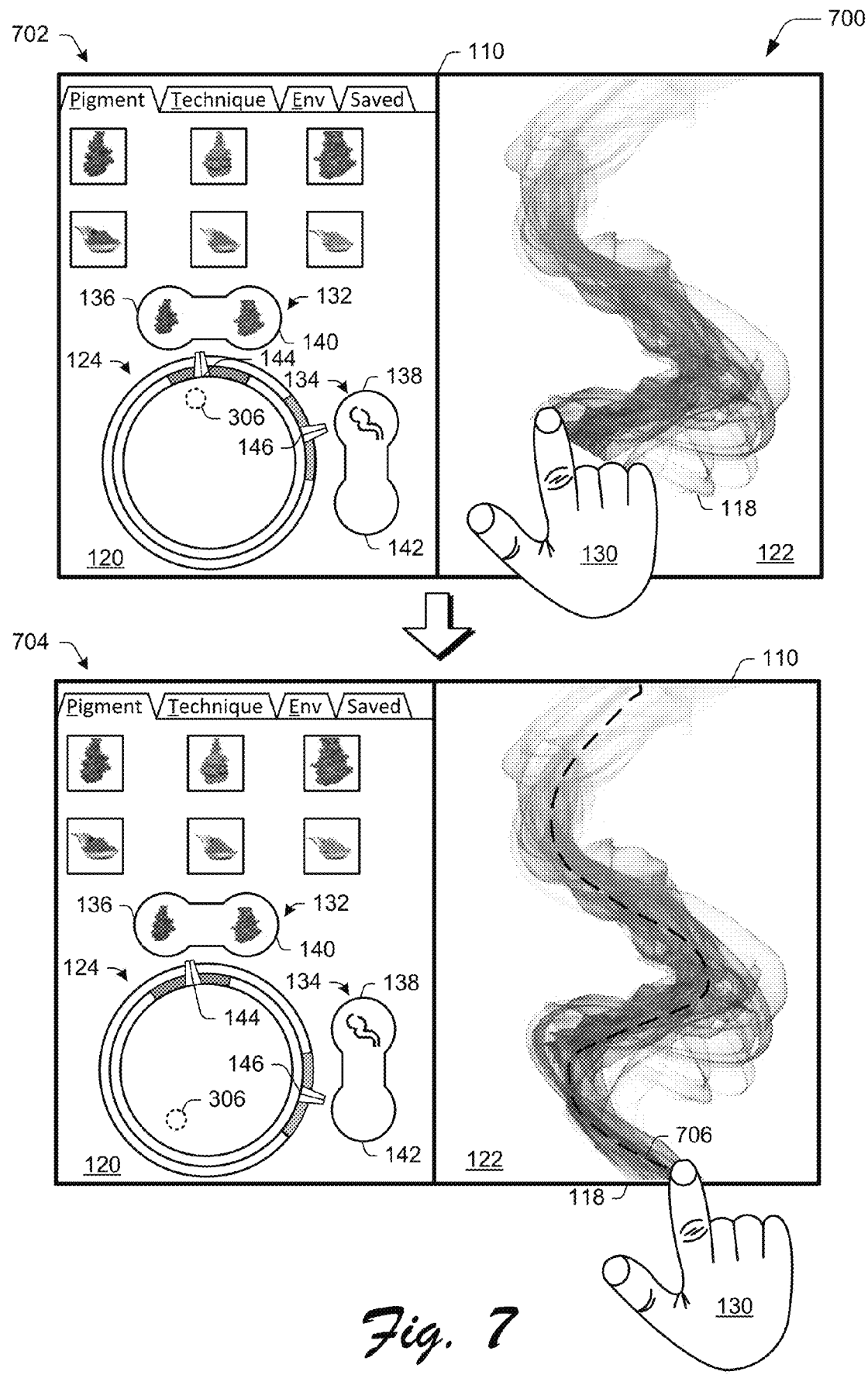

FIG. 2 depicts an example system 200 showing operation of the digital paint mixing system 116 of FIG. 1 in greater detail. FIG. 3 depicts an example implementation 300 of the paint generation control portion 120 and the mix control 124 of FIG. 2 as a multi-axis control. FIG. 4 depicts an example implementation 400 showing operation of the paint control module 202 and mix control 124 of FIG. 2 in greater detail. FIG. 5 depicts an example implementation 500 of user selection of digital paint properties for use as part of the mix control 124. FIGS. 6 and 7 depict example implementations of generation and display of digital paint as feedback in real time caused through interaction with the mix control 124 of FIG. 5.

The following discussion describes techniques that may be implemented utilizing the previously described systems and devices. Aspects of each of the procedures may be implemented in hardware, firmware, software, or a combination thereof. In portions of the following discussion, reference is made interchangeably to FIGS. 1-7.

The system 200 of FIG. 2 depicts the digital paint mixing system 116 of FIG. 1 in greater detail. The digital paint mixing system 116 includes a mix control 124 that is configured to specify amounts of digital paint properties 204 to be used to generate digital paint 118. The digital paint properties 204 are illustrated as stored in a storage device 108 of the computing device 102. As previously described, the digital paint properties 204 include color paint properties 206, such as pigments 208. The digital paint properties 204 also include physical paint properties 210, including medium 212, surface 214, instrument 216, technique 218, and environment 220.

A user input device 224 is configured to receive user inputs 222 both to select digital paint properties to be used to generate the digital paint 118 as well as to specify amounts of the selected digital paint properties 204 used to generate the digital paint 118. The digital paint 118 is then output in the user interface 110, e.g., for display on the display device 112 of FIG. 1 as feedback 126. The mix control 124 is configurable in a variety of ways to facilitate this selection and specification, and example of which is described in the following and shown in a corresponding figure.

FIG. 3 depicts a system 300 in an example implementation showing the mix control 124 of FIG. 2 as implemented as a multi-axis control. The mix control 124 is implemented in this example by a mix control module 302 of the paint control module 202. The mix control module 302 uses a first axis 132 and a second axis 134 to define a multi-axis input space 304, which in this instance is defined using X and Y axes or other perpendicular relationship. Other examples are also contemplated, including addition of a Z axis in a virtual or augmented reality implementation.

In this example, a single user input 306 is usable to define a relationship 308 with respect to both the first and second axes 132, 134. This relationship 308 may then be used to specify amounts of digital paint properties associated with those axes that are to be used to generate digital paint 118. First and second digital paint properties 310, 312, for instance, are defined at opposing ends of the first axis 132 that corresponds to an X axis in the multi-axis input space 304. Likewise, third and fourth digital paint properties 314, 316 are defined at opposing ends of the second axis 134.

The single user input 306 thus defines a relationship 308 between the opposing ends of the first axis 132 as well as the opposing ends of the second axis 134. From this, the mix control module 302 determines amounts of associated first, second, third, and fourth digital paint properties 310, 312, 314, 316 to be used to generate digital paint 118. The multi-axis input space 304, for instance, may define a grid, from which, closeness of the single user input 306 to respective first and second axes 132, 134 (e.g., X and Y axes) is determined. Thus, the single user input 306 may be used to define a continuous inverse relationship between the digital paint properties defined at the ends of the first and second axes 132, 134. In other words, greater amounts of a digital paint property at one end of an axis cause lesser amount of a digital paint property at another end of the axis.

This user input may continue 306 through continued movement of the user input 306 in the multi-axis input space 304 to make continued changes to these amounts, e.g., through different gradations between opposing ends of the axes.

FIG. 4 depicts a system 400 in an example implementation in which the mix control module 302 and mix control 124 are shown in greater detail as incorporated as part of the paint control module 202 to generate digital paint 118. To begin, the paint control module 202 includes a digital paint property selection module 302 that supports user interaction to select digital paint properties 404 to be used by the mix control 124 of the mix control module 302.

FIG. 5 depicts an example implementation of selection of digital paint properties for use by the mix control 124 by the digital paint property selection module 402 of FIG. 4. This implementation 500 is illustrated using first, second, and third stages 502, 504, 506.

A user selection, for instance, is received of a first digital paint property and a second digital paint property via a user interface, e.g., via a user input device 224. At the first stage 502, a finger of a user's hand 128 is used to select a pigment 162 option from a menu of pigments, i.e., color digital paint properties. The represented pigment 162 is dragged to a first end 136 of a first axis 132 of the mix control 124. Likewise, at the second stage 504, the finger of the user's hand 128 is used to select another pigment 166 option, which is the dragged to a second end 140 of the first axis 132.

At the third stage 506, a menu of medium 156 options is displayed in the user interface 110. From this, a medium option of a physical digital paint property (e.g., smoke 508) is selected for inclusion at a first end 138 of the second axis 134 of the mix control. The second end 142 of the second axis 134 of the mix control 124 is left blank (i.e., open) in this example, which also supports user interaction as further described below. Other examples of selection are also contemplated without departing from the spirit and scope thereof, such as use of a cursor control device, spoken utterance, and so forth.

Thus, the selected digital paint properties 404 are provided from the digital paint property selection module 402 to the mix control module 302. In response, the mix control module 302 associates the first digital paint property (e.g., pigment 162 option) with a first end 136 of the first axis 132 of the mix control 124 and the second digital paint property (e.g., pigment 166 option) with the second end 140 of the first axis 132 of the mix control 124 (block 804).

Likewise, a third digital paint property (e.g., smoke 508) is associated with a first end 138 of the second axis 134 of the mix control 124 and a fourth "null" digital paint property is associated with a second end 142 of the second axis 134. This configures the mix control 124 to implement a multi-axis input space 304 that is usable via a single user input 128. Other examples are also contemplated, such as a single axis or three or more axes input space, e.g., in a virtual reality space.

Referring again to FIG. 2, a user input is received by the mix control module 302 involving user interaction with the mix control 124 via the user interface 110. From this, a relationship is determined by the mix control 124 (e.g., as determined relationship data 406) of the user input to the first and second ends of the axis of the mix control 124 in the user interface 110. The determined relationship data 406 is then provided to a digital paint generation module 408 to generate the digital paint 118 as specified by this data, which is output in the user interface 110.

FIGS. 6 and 7 depict example implementations 600, 700 of user interaction with the mix control 124 and generation of digital paint 118. FIGS. 6 and 7 are depicted using first, second, third, and fourth stages 602, 604, 702, 704 showing sequential user interaction with the control.

At the first stage 602, the first and second ends 136, 138, 140, 142 of the first and second axes 132, 134 of the mix control are configured as described in relation to FIG. 5. The mix control 124 is configured as a multi-axis control having a multi-axis input space implemented using concentric dials. Other examples are also contemplated of implementing a multi-axis input space (e.g., multiple sliders) or a single axis input space, e.g., a single slider.

At the first stage 602, a single user input 306 is received with respect to the first and second axes 132, 134, e.g., via a finger of the user's hand 128 as detected using touchscreen functionality of the display device 112. The user input 306 in this instance is closer to the second end 140 than the first end 136 of the first axis 132. In response, digital paint 118 is generated by the digital paint generation module 408 having more of a pigment 166 option (e.g., blue) associated with the second hand 130 than pigment 162 option (e.g., red) associated with the first end 136. These relative amounts are also illustrated by the indication 144 associated with the mix control 124.

Additionally, the user input 306 is disposed at the closest positioning available to the first end 138 of the second axis 134 and further away from the second end 142. In response, the digital paint 118 is also generated to have a maximum amount of a physical digital paint property associated with the first end 138 of the axis, e.g., smoke 508. Thus, the output of the generated digital paint is based on a mix of color digital paint properties and physical digital paint properties.

At the second stage 602, the single user input 306 is moved a greater amount along the second axis 134 than the first axis 132. In response, a slight color change is noted in the generation of the digital paint 118 to include more of the pigment 162 option associated with the first end 136 than the pigment 166 option associated with the second end 140 of the first axis 132.

Additionally, a larger change is exhibited in the generation of the digital paint 118 to include additional amounts of a null option of the second end 142 of the second axis 134 and thus less of a smoke 508 physical digital paint property. Thus, the null option of the second axis 134 supports definition of amounts of the digital paint property on an opposing side of the axis, solely, without affecting another digital paint property.

At the third stage 702, the user input 306 defines a relationship between the first and second ends 136, 140 of the first axis 132 to further increase amount of the pigment 162 option associated with the first end 136 than the pigment 166 option associated with the second end 140. This causes the digital paint to appear as magenta in this example rather than purely blue as shown in the first and second stages 602, 604. Further, the single user input 306 defines a return to a maximum amount of a digital paint property associated with a first end 138 as opposed to a second end 142 of the second axis 134. This causes the digital paint 118 to exhibit a maximum amount of the smoke 508 physical digital paint property.

At the fourth stage 704 in this example, the user input 306 defines a relationship between the first and second ends 136, 140 of the first axis 132 as a maximum amount of the pigment 162 option associated with the first end 136 and minimum amount of the pigment 166 option associated with the second end 140. This causes the digital paint to appear more red in this example than the magenta color as shown at the third stage 702 and the blue as shown in the first and second stages 602, 604.

Further, the single user input 306 defines a return to a lesser amount of a digital paint property associated with a first end 138 as opposed to a second end 142 of the second axis 134. This causes the digital paint 118 to reduce the amount of the smoke 508 physical digital paint property used to generate the digital paint 118. Thus, the mix control 124 supports a single user input 306 to define a continuous inverse relationship of digital paint properties defined at opposing axes, which may include combination of both color and physical digital paint properties. A result of this is output as feedback to follow a freeform line 706 drawn in the user interface such that a user may readily compare changes to the digital paint properties to each other concurrently over time, e.g., as changes in color, application of physical digital paint properties (e.g., smoke as illustrated), and so forth.

In this way, a user may specify digital paint properties to be used to generate digital paint as well as amounts of the specified digital paint properties through interaction with the digital paint mixing system 116. The digital paint mixing system 116 may also support interactions between the physical digital paint properties and an intensity of those interaction through sue of the mix control 124, an example of which is described in the following section.

Physical Digital Paint Property Interaction

Figure 8:
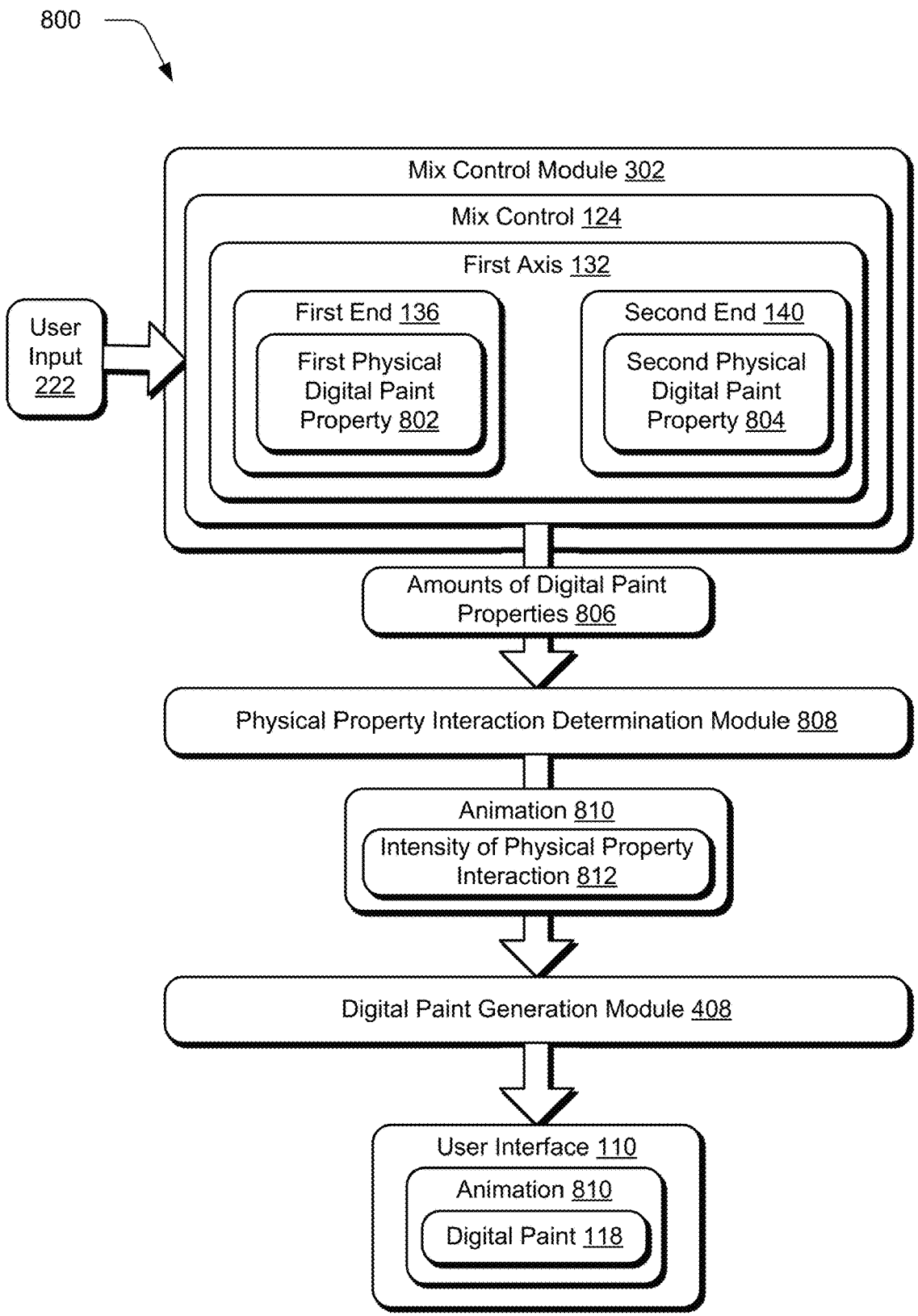
FIG. 8 depicts a system in which interaction of physical digital paint properties is used to generate an animation of digital paint.
Figure 9:
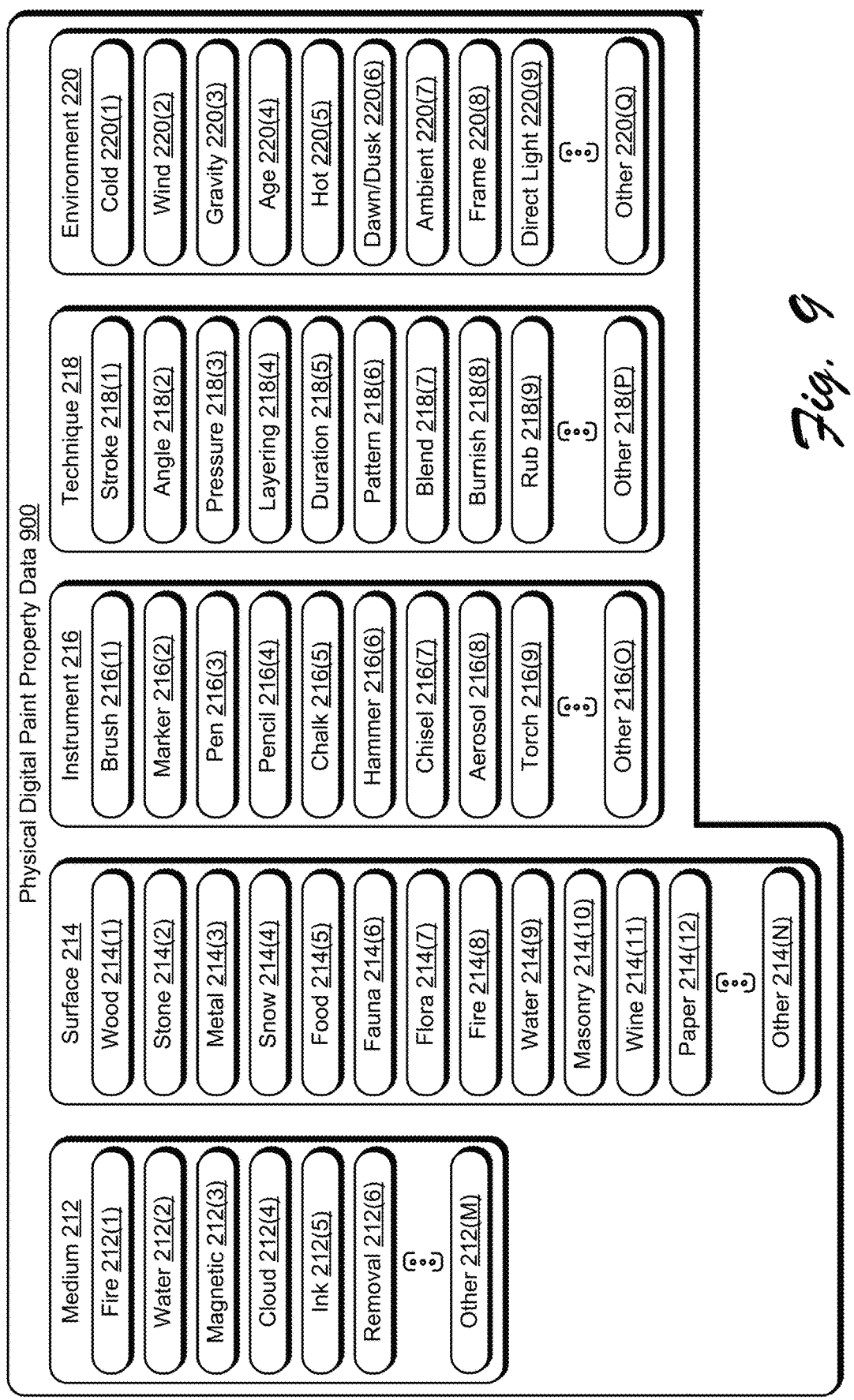
FIG. 9 depicts an example implementation of physical digital paint property data that serves as a basis to determine physical digital paint property interaction.
Figure 10:
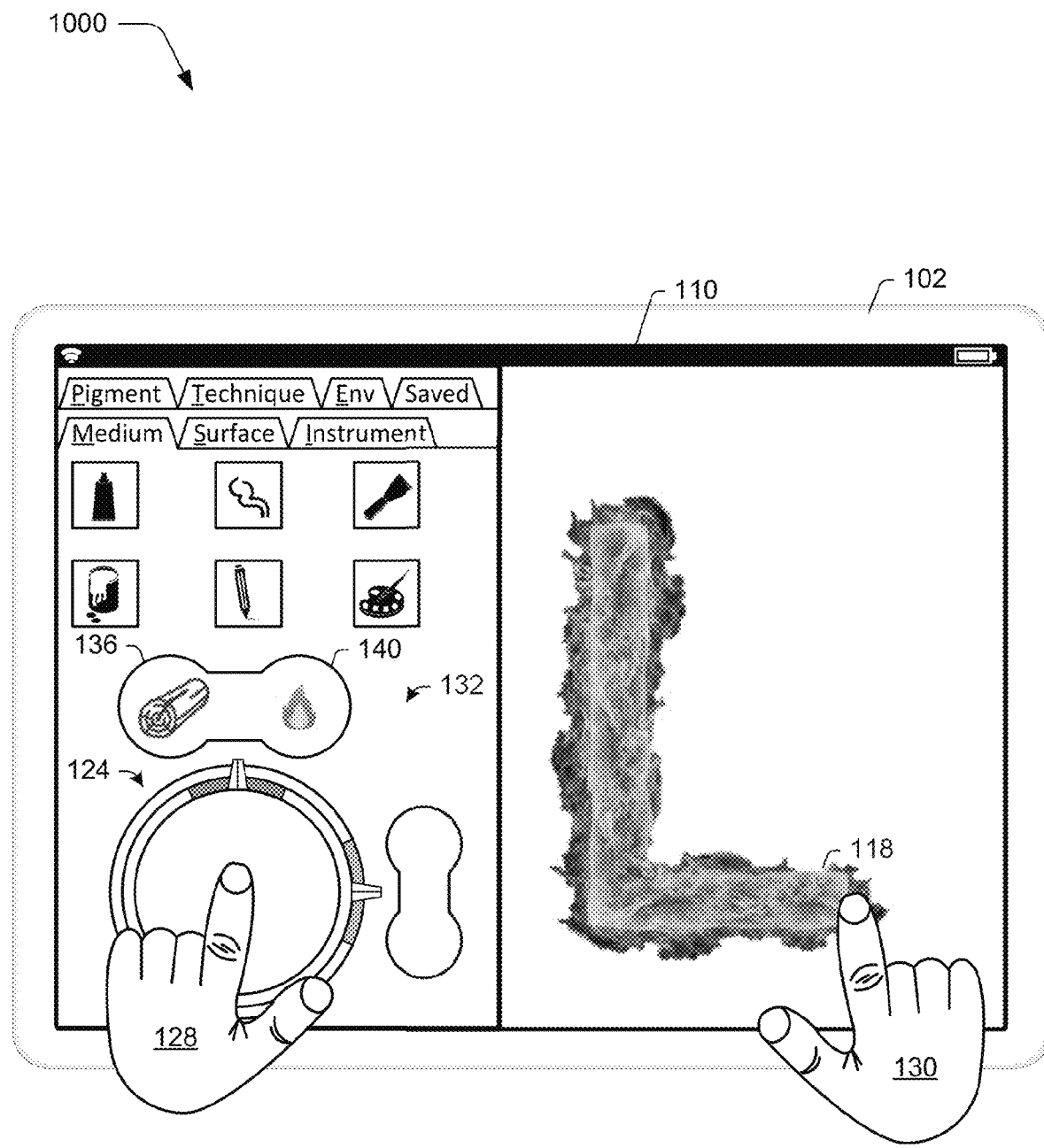
FIG. 10 depicts an example implementation of output of an animation generated based on physical digital paint properties specified for use in generation of digital paint.
Figure 11:
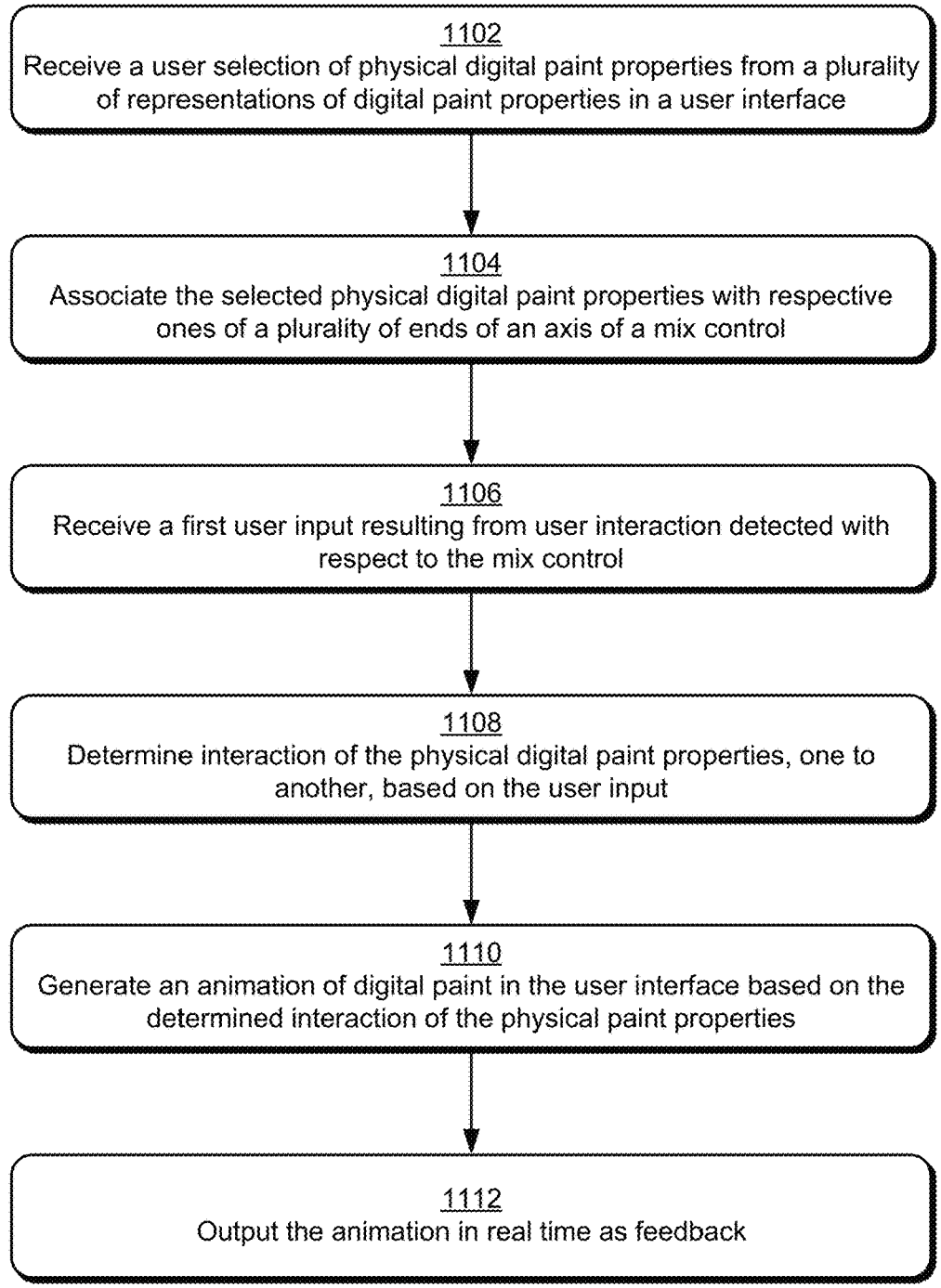
FIG. 11 is a flow diagram depicting an example procedure of animation generation based on physical digital paint property interaction.

FIG. 8 depicts a system 800 in which interaction of physical digital paint properties is used to generate an animation of digital paint 118. FIG. 9 depicts an example implementation of physical digital paint properties stored as data that serves as a basis to determine physical digital paint property interaction. FIG. 10 depicts an example implementation 1000 of output of an animation generated based on physical digital paint properties specified for use in generation of digital paint. FIG. 11 depicts an example procedure 1100 of animation generation based on physical digital paint property interaction.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made interchangeably to FIGS. 8-11.

In the previous sections, amounts of digital paint properties are specified through interaction with the mix control 124 to generate digital paint. This may be used to mix different color digital paint properties (e.g., green and blue pigments) as well as physical digital paint properties, e.g., medium 212, surface 214, instrument 216, technique 218, and environment 220. The physical digital paint properties may be configured to mimic the physical world and may include meta and "supernatural" type properties such as gravity, attraction, repulsion, particle movement, and so forth. As a result, these techniques support creation of art that is not possible to conventional systems that are limited to color, alone. In this section, interaction is described of physical digital paint properties with each other as part of digital paint generation.

As illustrated in FIG. 8, the mix control module 302 implements a mix control 124 having a first axis 132 as previously described. The first axis 132 includes first and second ends 136, 140 and a user selection is received of digital paint properties (e.g., first and second physical digital paint properties 802, 804) from a plurality of representations of digital paint properties in a user interface (block 1102). The selected digital paint properties are associated with respective ones of the first and second ends 136, 140 of the first axis 132 of the mix control 124 (block 1104) as previously described.

A first user input is received that results from user interaction detected with respect to the mix control 124 (block 1106). Interaction is determined by the mix control module 302 of the physical digital paint properties, one to another, based on the user input (block 1108). This may include single and multi-axis detection as described in relation to FIG. 3. Based on this, amounts of digital paint properties 808 are output as a result of user interaction with the mix control 124. Thus, these amounts may be output as previously described.

In this example, however, the amounts of digital paint properties 808 are provided to a physical property interaction determination module 1106. The physical property interaction determination module 1106 is configured to generate an animation 810 as part of generation of the digital paint 118 having an intensity of physical property interaction 812 based at least in part on the amounts of digital paint properties (block 1110). The animation 810 of the digital paint 118 is then output in a user interface 110 (block 1112) such that the generated digital paint 118 mimics this interaction. In this way, the generation of the digital paint 118 may expand beyond amounts of physical digital paint properties (e.g., an amount of smoke as shown in FIGS. 5 and 6) to also describe how these physical digital paint properties interact with each other and even an intensity of that interaction.

FIG. 9, for instance, depicts an example implementation of physical digital paint property data 900 that includes physical digital paint properties including medium 212, surface 214, instrument 216, technique 28, and environment 220. There are a variety of types of mediums 212 that may be mimicked by digital paint 118, both that exist in the real world or are imaginary. Illustrated medium 212 examples include fire 212(1), water 212(2), magnetic 212(3), cloud 212(4), ink 212(5), removal 212(6), and other 212(M) mediums. Thus, the medium 212 describes what material is modeled as being applied to a surface 214.

Likewise, there are a variety of types of surfaces 214 that may be mimicked by digital paint that either mimic real world surfaces or non-existent surfaces that are imagined and interaction with is mathematically modeled as part of the data. Examples of surfaces 214 include wood 214(1), stone 214(2), metal 214(3), snow 214(4), food 214(5), fauna 214(60, flora 214(7), fire 214(8), water 214(9), masonry 214(10), wine 214(11), paper 214(12), and other 214(N) surfaces. Thus, the surface 214 acts a base of the medium 212, e.g., is a substrate for the medium 212.

An instrument 216 refers to functionality of an instrument being mimicked to apply the medium 212 to the surface 214. Examples of instruments include a brush 216(1), marker 216(2), pen 216(3), pencil 216(4), chalk 216(5), hammer 216(6), chisel 216(7), aerosol 216(8), torch 216(9), and others 216(0). A technique 218 refers to a technique used by the instrument 216 to apply to medium 212 to the surface 214. Examples of techniques 218 include stroke 218(1), angle 218(2), pressure 218(3), layering 218(4), duration 218(5), pattern 218(6), blend 218(7), burnish 218(8), rub 218(9), and others 218(P).

An environment 220 refers to an environment in which the medium 212 is applied to the surface 214, e.g., by the instrument 216 using the technique 218. Examples of environments 220 includes cold 220(1), wind 220(2), gravity 220(3), age 220(4), hot 220(6), dawn/dusk 220(6), ambient 220(7), frame 220(8), direct light 220(9), and other 220(Q) environments. Thus, these variety of physical digital paint properties may describe a variety of physical characteristics modeled as part of generation of the digital paint 220 that include defined interactions between the properties.

FIG. 10 depicts an example implementation showing interaction of physical digital paint properties as part of generation of digital paint 118. In this example, the first axis includes first and second ends as before that include a representation of a wood surface and a fire medium. User interaction with the mix control 124 via the first hand 128 is usable to define intensity of an animation that defines interaction of the fire medium with the wood surface. In the illustrated example, adjustment of the mix control 124 specifies greater intensity by the fire medium in burning the wood surface as part of the animation 1108 generated by the physical property interaction determination module 1106. In this way, the amounts of physical digital paint properties defined through interaction with the mix control 124 also define an intensity of interactions employed as part of interaction of physical digital paint properties, e.g., to burn faster or slower.

A variety of techniques may be employed to generate the animation. A particle system, for instance, may be employed that uses a multitude of graphic objects to simulate chaotic environments, e.g., natural phenomena or processes caused by chemical reactions. Examples of chaotic environments includes fire, explosions, smoke, moving water, sparks, falling leaves, rock falls, clouds, fog, snow, dust, meteor tails, stars, and galaxies and abstract "magical" visual effects like glowing trails. This may also be used for animations involving strands, like fur, hair, and grass and support two or three dimensions. Examples of particle system techniques include Cinema 4D®, Lightwave®, Houdini®, Maya®, XSI®, 3D Studio Max®, and Blender®.

Graphic objects (i.e., particles) included as part of the animation are controlled by the image processing system 104 through use of an emitter. The emitter acts as a source of the particles, and its location in space (e.g., 2D or 3D) determines where the particles are generated and to where these particles move, e.g., as feedback 126 to follow the motion of the user's hand 130. The emitter includes a set of particle behavior parameters. These parameters can include the spawning rate (e.g., how many particles are generated per unit of time), the particles' initial velocity vector (e.g., a direction of emission upon creation), particle lifetime (the length of time each individual particle exists before disappearing), particle color, and so forth.

Upon animation, the number of new particles that are created by the image processing system 104 is calculated based on spawning rates and the interval between updates, and each of them is spawned in a specific position in 2D or 3D space based on the emitter's position and the spawning area specified. Each of the particle's parameters (e.g., velocity, color, and so on) is initialized according to the emitter's parameters. At each update, each existing particle is checked by the image processing system 104 to determine if the particle have exceeded its lifetime, in which case the respective particle is removed from the animation. Otherwise, the particles' position and other characteristics are advanced, which vary from translating a current position to employing physically accurate trajectory calculations which take into account external forces, e.g., gravity, friction, wind, and so on. After the update is complete, each particle is rendered by the image processing system 104, e.g., in the form of a textured bill-boarded quad (i.e., a quadrilateral that faces a viewer). In this way, the particles may be used to define and animate output of the digital paint 118.

In another example, an appearance transfer technique is used to generate realistic looking target images from a video exemplar, including fluid animations. This is performed by transferring an appearance of frames of the video exemplar to corresponding frames of an animation used to generate the digital paint 118. This may support a variety of fluid animations, such as fire, smoke, and water as resulting from physical digital property interactions. Similar techniques may also be employed for non-fluid animations. This may be performed in a variety of ways.

In one instance, a search and vote process is employed by the image processing system 104 to select patches from a frame of the video exemplar (e.g., a frame of a video exemplar) and then search for a location in a target image (e.g., a frame of the animation) that is a best fit for the patches. The frame, for instance, may have a defined area for output of the animation based on the digital paint properties, e.g., as feedback 126. As part of this selection, a patch usage counter is used by the image processing system 104 to ensure that selection of each of the patches from the image exemplar does not vary by more than one, one to another. Through use of the patch usage counter, selection by the image processing system 104 is ensured to include dynamic patches and thus maintains a dynamic appearance of the animation without "washing out" as encountered in other techniques that rely, solely, on an amount of entropy and thus are biased towards selection of less dynamic patches.

In the illustrated example, a video exemplar of fire is employed to generate the digital paint 118 as a flaming letter "L" using a patch-based approach, i.e., a patch matching algorithm Patches from a frame of the exemplar are used to fill an area within a frame of an animation that follows the inputs received from the second hand 130 of the user in this example, e.g., the freeform line 706. This transfer, for instance, may be performed to differentiate between boundary and interior portions to maintain visual consistency, e.g., edge and interior portions of a ball of flame. For example, boundary portions of the frame of the video exemplar may be used for patches to include in boundary portions of a respective frame of an animation. Likewise, interior portions of the frame of the video exemplar are used for patches to include in interior portions of the animation. In this way, different appearances of boundary and edge portions are maintained to provide a realistic looking appearance.

Temporal coherence may also be preserved between frames in the animation of the digital paint 118 in a manner that avoids the jerking and pulsing of the animation as observed using conventional techniques. In order to do so, a previous frame of the animation is warped. The previous frame occurs in a frame sequence of the animation before a particular frame being synthesized to define motion, e.g., using a motion field output of a fluid simulator to give an appearance of motion. Color of the particular frame is then transferred from an appearance of a corresponding frame of a video exemplar. In this way, smooth changes may be observed between successive frames while maintaining a dynamic appearance within the frames. Further discussion of these features is hereby incorporated by reference in its entirety from U.S. patent application Ser. No. 15/052,552, filed Feb. 24, 2016, and titled "Appearance Transfer Techniques."

As described above, a multitude of physical digital paint properties may be modeled in data to mimic characteristics of these properties in real life or based upon a user's imagination. So too, a multitude of interactions may also be defined based on interactions of this multitude of physical digital paint properties. For example, a fire medium 212(1) may define a burn interaction with respect to wood 214(1), scorch with respect to stone 214(2), melt with respect to metal 214(3) and snow 214(4), burn flora 214(7), put out by water 214(9), scorch masonry 214(1), put out by wine 214(11), scorch or burn paper 214(12) depending on intensity of the animation, and so forth. Likewise, a water 212(2) medium may soak wood 214(1), make stone 214(2) wet, rust metal 214(3), melt snow 214(4), make food 214(5) and paper 214(12) soggy, and so forth. These interactions are then displayed an animations, e.g., using the appearance transfer techniques described above.

In a meta example in which imaginary interaction is supported, yellow digital paint may be configured to be repelled by red digital paint through physical digital paint properties associated with these digital paints. Meta examples of medium 212, surface 214, instrument 216, technique 218, and environment 220 are also contemplated. A digital paint, for instance, may be generated as output in a weightless environment 220 as output by an ignition technique 218 of an instrument 216 of a rocket engine on a surface 214 as an airless void 214 as magnetic particles that cool. Thus, the digital paint generation techniques may expand beyond the limitations of conventional color selection and conventional techniques that mimic the real world. As a result, the digital paint 118 and digital images 106 may be created that are not possible nor even considered using conventional systems.

Example System and Device

Figure 12:
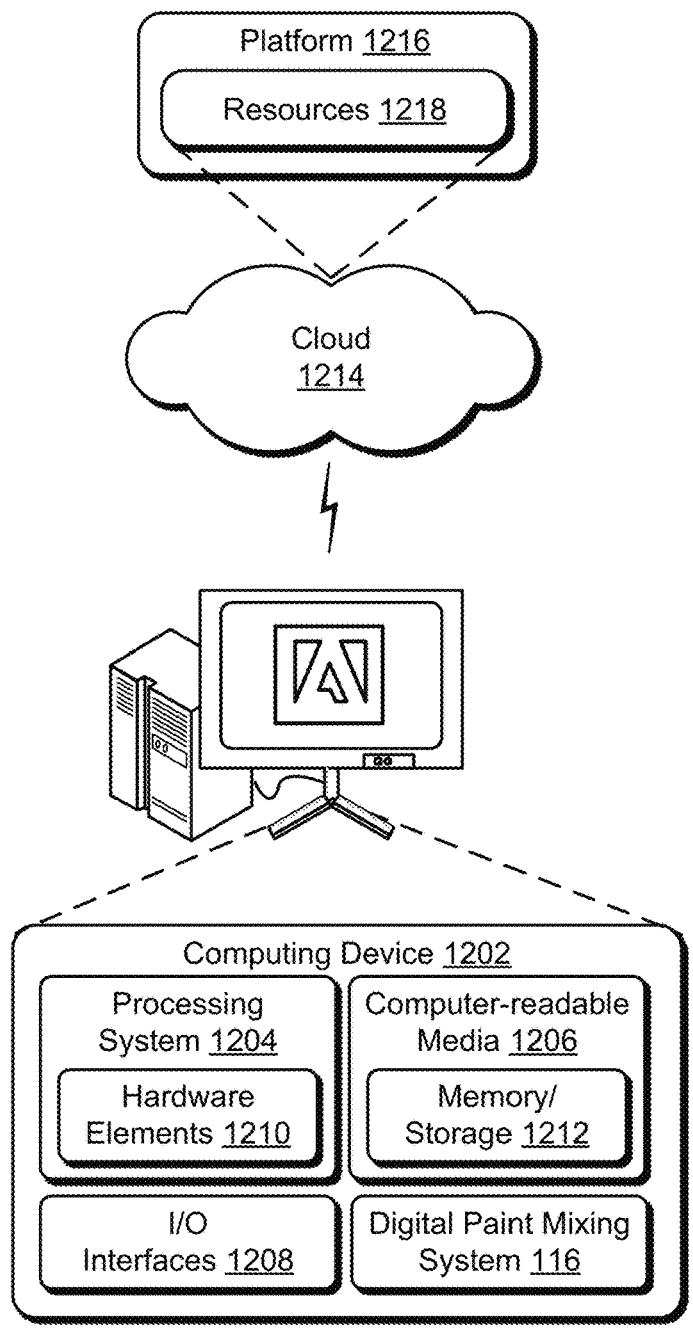
FIG. 12 illustrates an example system including various components of an example device that can be implemented as any type of computing device as described and/or utilize with reference to FIGS. 1-11 to implement embodiments of the techniques described herein.

FIG. 12 illustrates an example system generally at 1200 that includes an example computing device 1202 that is representative of one or more computing systems and/or devices that may implement the various techniques described herein. This is illustrated through inclusion of the digital paint mixing system 116. The computing device 1202 may be, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch from a user's finger or stylus), a camera (e.g., which may employ visible or non-visible wavelengths such as infrared frequencies to recognize movement as gestures that do not involve touch), spatially aware input device (e.g., motion tracking), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 may include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 may abstract resources and functions to connect the computing device 1202 with other computing devices. The platform 1216 may also serve to abstract scaling of resources to provide a corresponding level of scale to encountered demand for the resources 1218 that are implemented via the platform 1216. Accordingly, in an interconnected device embodiment, implementation of functionality described herein may be distributed throughout the system 1200. For example, the functionality may be implemented in part on the computing device 1202 as well as via the platform 1216 that abstracts the functionality of the cloud 1214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital paint generation and physical property animation environment, a method implemented by at least one computing device, the method comprising:
   receiving, by the at least one computing device, user selection of at least two color or physical digital paint properties via a user interface;
   associating, by the at least one computing device, the at least two color or physical digital paint properties with a mix control in the user interface;
   receiving, by the at least one computing device, a first user input resulting from user interaction detected with respect to the mix control in the user interface as specifying amounts of both of the at least two color or physical digital paint properties;
   determining, by the at least one computing device, interaction of the at least two color or physical digital paint properties based on the first user input; and
   generating, by the at least one computing device, an animation of digital paint in the user interface in real time as following a second user input with respect to the user interface and having the amounts of the at least two color or physical digital paint properties as the first user input is received based on the interaction of the at least two color or physical digital paint properties.

2. The method as described in claim 1, wherein:
   the determining of the interaction of the at least two color or physical digital paint properties includes determining an intensity of the interaction of the at least two color or physical digital paint properties based on the first user input; and
   the generating of the animation of the digital paint is based on the determined intensity.

3. The method as described in claim 1, wherein the physical digital paint properties include a medium of the digital paint.

4. The method as described in claim 1, wherein the physical digital paint properties include a surface on which the digital paint is applied.

5. The method as described in claim 1, wherein the physical digital paint properties include an instrument used to apply the digital paint on a surface.

6. The method as described in claim 1, wherein the physical digital paint properties include a technique used by an instrument to apply the digital paint on a surface.

7. The method as described in claim 1, wherein the physical digital paint properties include an environment in which a medium of the digital paint and a surface on which the digital paint is to be applied are disposed within.

8. The method as described in claim 1, wherein the user selection includes user selection of representations of the at least two color or physical digital paint properties from a plurality of representations of digital paint properties in the user interface.

9. The method as described in claim 1, wherein the physical digital paint properties are each associated with a different pigment of a plurality of pigments used to generate the digital paint.

10. The method as described in claim 9, further comprising determining amounts of the different pigments based on the first user input and wherein the generating of the digital paint is based at least in part on the determined amounts of the different pigments.

11. The method as described in claim 1, further comprising detecting, by the at least one computing device, the second user input as specifying a portion of the user interface and wherein the generating of the digital paint in the user interface applies the digital paint to the specified portion.

12. The method as described in claim 11, wherein the generating of the animation of the digital paint is performed in real time as the second user input is received.

13. In a digital paint generation and physical property animation environment, a system comprising:
   a mix control module implemented at least partially in hardware of at least one computing device for executing instructions to determine amounts of physical digital paint properties to be used to generate digital paint based on a first user input, the first user input resulting from user interaction detected with respect to a mix control in a user interface;
   a physical property interaction determination module implemented at least partially in the hardware of the at least one computing device for executing instructions to determine interaction of the physical digital paint properties based on the amounts of the physical digital paint properties; and
   a digital paint generation module implemented at least partially in the hardware of the at least one computing device for executing instructions to generate an animation of the digital paint in the user interface in real time as following a second user input with respect to the user interface based on the determined interaction of the physical digital paint properties as the first user input is received.

14. The system as described in claim 13, wherein:
   the determining of the interaction of the physical digital paint properties by the physical property interaction determination module includes determining an intensity of the interaction of the physical digital paint properties based on the first user input; and the generating of the animation of the digital paint by the digital paint generation module is based on the determined intensity.

15. The system as described in claim 13, wherein the physical digital paint properties include:
- a medium of the digital paint;
- a surface on which the digital paint is applied;
- an instrument used to apply the digital paint on the surface;
- a technique used by the instrument to apply the digital paint on the surface; and
- an environment in which the medium of the digital paint and the surface on which the digital paint is to be applied are disposed within.

16. The system as described in claim 13, further comprising a feedback module implemented by the at least one computing device to detect the second user input as specifying a portion of the user interface and wherein the generating of the digital paint in the user interface applies the digital paint to the specified portion.

17. The system as described in claim 16, wherein the generating of the animation of the digital paint is performed in real time by the feedback module and the digital paint generation module as the second user input is received.

18. In a digital paint generation and physical property animation environment, a system comprising:
- means for determining amounts of both of at least two color or physical digital paint properties to be used to generate digital paint based on a first user input, the first user input resulting from user interaction detected with respect to a mix control in a user interface;
- means for determining interaction of the at least two color or physical digital paint properties based on the first user input;
- means for detecting a second user input specifying a portion of the user interface; and
- means for generating an animation of digital paint at the portion of the user interface in real time as the first input is received based on the interaction of the at least two color or physical digital paint properties and the amounts of the at least two color or physical digital paint properties.

19. The system as described in claim 18, wherein the physical digital paint properties include:
- a medium of the digital paint;
- a surface on which the digital paint is applied;
- an instrument used to apply the digital paint on the surface;
- a technique used by the instrument to apply the digital paint on the surface; and
- an environment in which the medium of the digital paint and the surface on which the digital paint is to be applied are disposed within.

20. The system as described in claim 18, wherein the generating means generates the animation of the digital paint in real time as the second user input is detected.

* * * * *